United States Patent
Ishikawa (10) Patent No.: US 11,711,507 B2
(45) Date of Patent: Jul. 25, 2023

(54) INFORMATION PROCESSING APPARATUS, PROGRAM AND INFORMATION PROCESSING METHOD

(75) Inventor: Tsuyoshi Ishikawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 485 days.

(21) Appl. No.: 13/230,639

(22) Filed: Sep. 12, 2011

(65) Prior Publication Data

US 2012/0069006 A1 Mar. 22, 2012

(30) Foreign Application Priority Data

Sep. 17, 2010 (JP) ................................ 2010-209833

(51) Int. Cl.
| | |
|---|---|
| *H04N 13/00* | (2018.01) |
| *H04N 13/128* | (2018.01) |
| *H04N 13/271* | (2018.01) |
| *H04N 13/178* | (2018.01) |
| *H04N 13/183* | (2018.01) |
| *H04N 13/156* | (2018.01) |

(52) U.S. Cl.
CPC ......... *H04N 13/178* (2018.05); *H04N 13/128* (2018.05); *H04N 13/156* (2018.05); *H04N 13/183* (2018.05)

(58) Field of Classification Search
CPC . H04M 1/0266; H04N 13/0033; H04N 13/00; H04N 13/04; H04N 9/80; H04N 5/278; H04N 13/178; H04N 13/128; H04N 13/156; H04N 13/183
USPC ............. 348/43, 51; 345/418, 419; 382/106, 382/154; 340/407.2; 455/566; 386/248
See application file for complete search history.

(56) References Cited

U.S. PATENT DOCUMENTS

| | | | | |
|---|---|---|---|---|
| 9,063,649 | B2 * | 6/2015 | Kim .................... | G06F 3/04815 |
| 2009/0315981 | A1 * | 12/2009 | Jung et al. ....................... | 348/43 |
| 2010/0208040 | A1 * | 8/2010 | Guillou .......................... | 348/51 |
| 2010/0208942 | A1 * | 8/2010 | Porter et al. ................... | 382/106 |
| 2010/0272417 | A1 * | 10/2010 | Nagasawa ............ | H04N 13/183 |
| | | | | 386/239 |
| 2010/0302355 | A1 * | 12/2010 | Tamaru ................ | H04N 13/398 |
| | | | | 348/59 |

(Continued)

FOREIGN PATENT DOCUMENTS

| | | | | |
|---|---|---|---|---|
| JP | 2010-045584 | | 2/2010 | |
| WO | WO-2021240069 | A1 * | 12/2021 | ............. G06T 15/04 |

*Primary Examiner* — Albert Kir
(74) *Attorney, Agent, or Firm* — Paratus Law Group, PLLC (57) ABSTRACT

An apparatus and method provide logic for processing information. In one implementation, an apparatus includes a display unit configured to display a first stereoscopic image. The first stereoscopic image includes a first and a second content, which may be disposed at corresponding display positions in a depth direction, and at least a portion of the first content appears to overlap at least a portion of the second content. A position-changing unit is configured to modify the display positions of the first and second content, in response to the apparent overlap. A control unit is configured to generate a signal to display, a second stereoscopic image that includes the first and second content disposed at the modified display positions. The display unit is further configured to display the second stereoscopic image such that the second stereoscopic image reduces the apparent overlap between the first and second content.

15 Claims, 7 Drawing Sheets

(56) References Cited

U.S. PATENT DOCUMENTS

| | | | | |
|---|---|---|---|---|
| 2010/0303444 | A1* | 12/2010 | Sasaki | G11B 27/105 386/248 |
| 2011/0013888 | A1* | 1/2011 | Sasaki | H04N 21/234327 386/354 |
| 2011/0169825 | A1* | 7/2011 | Ishiyama | H04N 13/183 345/419 |
| 2011/0202845 | A1* | 8/2011 | Mountjoy | H04N 21/816 715/733 |
| 2011/0255775 | A1* | 10/2011 | McNamer | G06T 7/596 382/154 |
| 2011/0292176 | A1* | 12/2011 | Jung | H04N 21/8146 348/43 |
| 2011/0292189 | A1* | 12/2011 | Newton | H04N 5/278 348/51 |
| 2011/0316679 | A1* | 12/2011 | Pihlaja | 340/407.2 |
| 2012/0019528 | A1* | 1/2012 | Ugawa | H04N 13/128 345/419 |
| 2012/0050473 | A1* | 3/2012 | Suh | H04N 5/44543 348/43 |
| 2013/0165186 | A1* | 6/2013 | Choi | 455/566 |
| 2014/0125778 | A1* | 5/2014 | Kim et al. | 348/51 |
| 2014/0362187 | A1* | 12/2014 | Hayashi | G06F 3/01 345/173 |
| 2020/0273434 | A1* | 8/2020 | Iwata | H04N 13/356 |

* cited by examiner

| OBJECT ID | OBJECT NAME | Z COORDINATE | OFFSET VALUE |
|---|---|---|---|
| 1 | BIRD 1 | 128 | -128 |
| 2 | BIRD 2 | 64 | -96 |
| 3 | CLOUD | 0 | -64 |

FIG. 7

INFORMATION PROCESSING APPARATUS, PROGRAM AND INFORMATION PROCESSING METHOD

BACKGROUND

The disclosed exemplary embodiments relate to an information processing apparatus, a program, and an information processing method.

In recent years, information processing apparatuses that provide stereoscopic images to a user by using a display apparatus, such as a TV set and a display of a PC (Personal Computer), are becoming increasingly popular. A stereoscopic image is realized, as described in, for example, Japanese Patent Application Laid-Open No. 2010-045584, by providing a predetermined parallax between a left-eye image presented to a left eye of an observer and a right-eye image presented to a right eye thereof.

An information processing apparatus that provides stereoscopic images acquires stereoscopic image content containing the above left-eye image and right-eye image by, for example, reproduction of image data or reception of a broadcasting signal. The information processing apparatus controls the display apparatus in such a way that the left-eye image is presented to the left eye, and the right-eye image is presented to the right eye. Accordingly, for example, an image containing objects displayed stereoscopically with a depth is perceived by the observer.

SUMMARY

An information processing apparatus that provides stereoscopic images as described above frequently causes a display apparatus to display such stereoscopic images by superimposing another image, for example, a user interface to operate the information processing apparatus, on an image based on stereoscopic image content. In such a case, the other superimposing image may overlap with an object contained in the displayed image, making it difficult for an observer to recognize the other superimposing image. For example, when a touch panel is provided on a display screen of the display apparatus and the information processing apparatus is operated by contact with a position corresponding to the above other image on the display screen, it is difficult to recognize the image displayed by being superimposed on stereoscopic image content, hindering an operation.

In light of the foregoing, it is desirable to provide an information processing apparatus, program, and information processing method capable of reducing interference between a stereoscopic image and another image displayed by being superimposed thereon.

Consistent with an exemplary embodiment, an information processing apparatus includes a display unit configured to display a first stereoscopic image to a user, the first stereoscopic image including a first content and a second content. The first and second content are disposed at corresponding display positions in a depth direction, and at least a portion of the first content appears to the user to overlap at least a portion of the second content. A position-changing unit is configured to modify the display positions of the first and second content, in response to the apparent overlap. A control unit is configured to generate a signal to display a second stereoscopic image to the user, the second stereoscopic image including the first and second content disposed at the modified display positions. The display unit is further configured to display the second stereoscopic image to the user, the second stereoscopic image reducing the apparent overlap between the first and second content.

Consistent with an additional exemplary embodiment, a computer-implemented method for processing information includes displaying a first stereoscopic image to a user. The first stereoscopic image comprising a first content and a second content, the first and second content being disposed at corresponding display positions in a depth direction, and at least a portion of the first content appears to the user to overlap at least a portion of the second content. The method further includes modifying the display positions of the first and second content, in response to the apparent overlap, and generating a signal to display a second stereoscopic image to the user. The second stereoscopic image includes the first and second content disposed at the modified display positions, and the second stereoscopic image reduces the apparent overlap between the first and second content.

Consistent with a further exemplary embodiment, a non transitory, computer-readable storage medium stores a program that, when executed by a processor, causes the processor to perform a method for processing information. The method includes displaying a first stereoscopic image to a user. The first stereoscopic image comprising a first content and a second content, the first and second content being disposed at corresponding display positions in a depth direction, and at least a portion of the first content appears to the user to overlap at least a portion of the second content. The method further includes modifying the display positions of the first and second content, in response to the apparent overlap, and generating a signal to display a second stereoscopic image to the user. The second stereoscopic image includes the first and second content disposed at the modified display positions, and the second stereoscopic image reduces the apparent overlap between the first and second content.

According to the disclosed exemplary embodiments, as described above, interference between a stereoscopic image and another image displayed by being superimposed thereon can be reduced.

DETAILED DESCRIPTION OF THE EMBODIMENTS

Hereinafter, preferred exemplary embodiments will be described in detail with reference to the appended drawings.

Note that, in this specification and the appended drawings, structural elements that have substantially the same function and structure are denoted with the same reference numerals, and repeated explanation of these structural elements is omitted.

Figure 1:
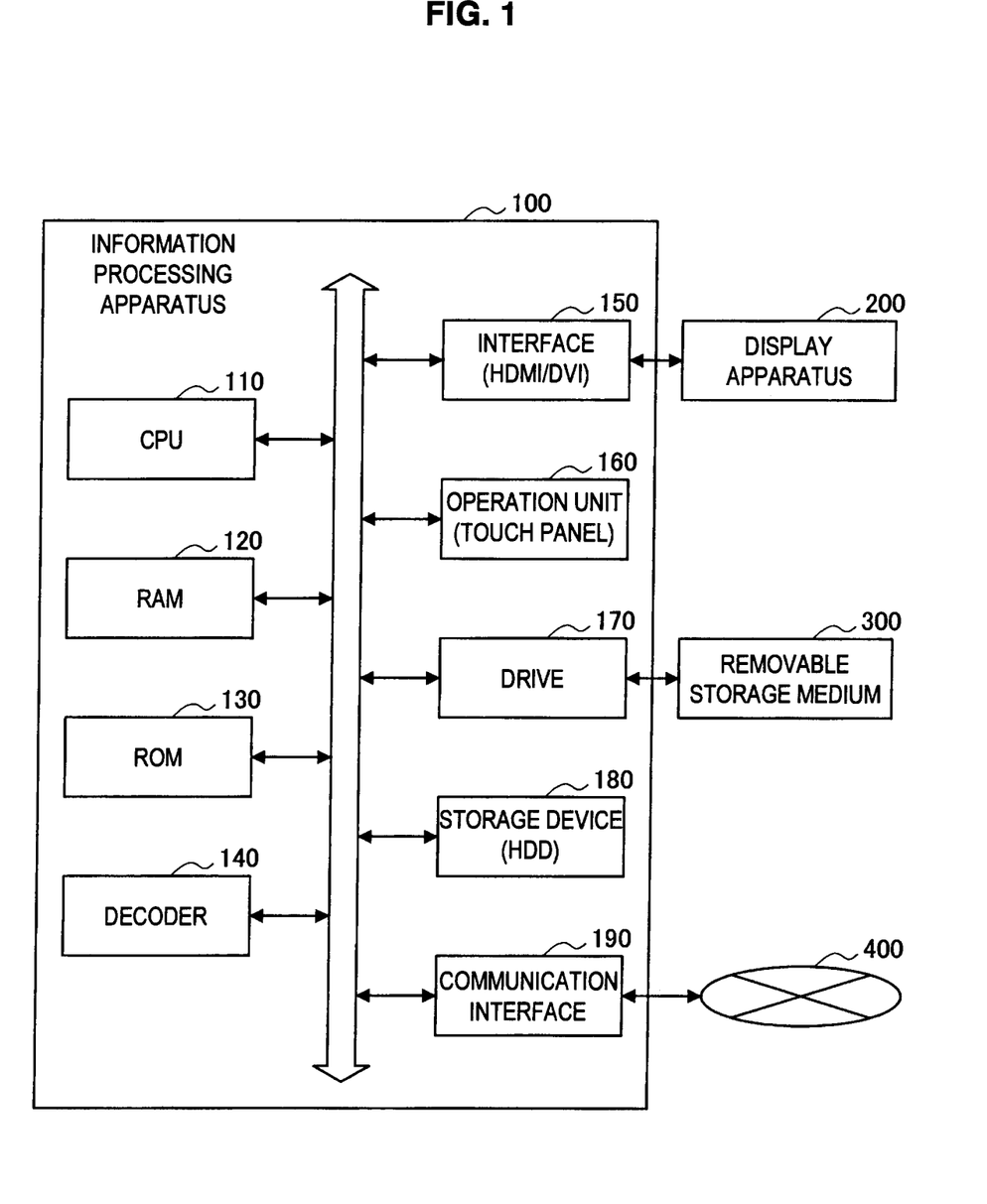
FIG. 1 is a block diagram illustrating an apparatus configuration of an information processing apparatus according to a first exemplary embodiment.

The description will be provided in the order shown below:
1. First Exemplary Embodiment
1-1. Apparatus Configuration of Information Processing Apparatus
1-2. Position Change in Depth Direction
2. Second Exemplary Embodiment
3. Third Exemplary Embodiment 1. First Exemplary Embodiment 1-1. Apparatus Configuration of Information Processing Apparatus First, the apparatus configuration of an information processing apparatus 100 according to the first exemplary embodiment will be described with reference to FIG. 1. A reference to FIG. 1 shows that the information processing apparatus 100 includes a CPU 110, a RAM 120, a ROM 130, a decoder 140, an interface 150, an operation unit 160, a drive 170, a storage device 180, and a communication interface 190 and each apparatus or element is connected via a bus.

The CPU (Central Processing Unit) 110 functions as an arithmetic processing unit and control apparatus and controls overall operations in the information processing apparatus 100 or a portion thereof according to various programs stored in the RAM 120, the ROM 130, the storage device 180, or a removable storage medium 300. The RAM 120 temporarily stores a program used for an operation of the CPU 110 or parameters that suitably change in execution thereof. The ROM 130 stores programs or operation parameters used by the CPU 110. A program used by the CPU 110 may be provided by being stored in, for example, the removable storage medium 300, downloaded from a network 400 via the communication interface 190, or stored in the storage device 180 in advance.

The decoder 140 reproduces a stereoscopic content image from image data stored in the storage device 180 or the removable storage medium 300, image data acquired from the network 400 via the communication interface 190, or a broadcasting signal received by using an antenna (not shown). The decoder 140 may be realized by a dedicated hardware circuit or as one function of the CPU 110.

The interface 150 is for connecting a display apparatus 200 to the information processing apparatus 100. The interface 150 sends a stereoscopic content image reproduced by the decoder 140 or an image generated or processed by the CPU 110 to the display apparatus 200. If, for example, the display apparatus 200 is a TV set, the interface 150 may be HDMI (High-Definition Multimedia Interface). If the display apparatus 200 is a PC monitor, the interface 150 may be DVI (Digital Visual Interface).

The display apparatus 200 is a TV set or a PC display using, for example, an LCD (Liquid Crystal Display), PDP (Plasma Display Panel), or organic EL (Electro-Luminescence). The display apparatus 200 displays a stereoscopic image by presenting, for example, a left-eye image to the left eye of the user and a right-eye image to the right eye of the user by using a parallax barrier method, a frame sequential method or the like.

The operation unit 160 is a means for acquiring an operation by the user to input various kinds of data into the information processing apparatus 100 or instruct the information processing apparatus 100 to perform a processing operation. The operation unit 160 may be, for example, a touch panel provided on the display screen of the display apparatus 200. In addition, the operation unit 160 may be various operation means such as a mouse, keyboard, touch panel, button, switch and lever. Furthermore, the operation unit 160 may be a remote controller using infrared rays or other radio waves. Alternatively, the operation unit 160 may be an externally connected device such as a mobile phone or PDA, which processes the operation of the information processing apparatus 100.

The drive 170 is a reader writer for a storage medium and is attached to the information processing apparatus 100 internally or externally. The drive 170 reads information stored in the removable storage medium 300 such as an inserted magnetic disk, optical disk, magneto-optical disk, and semiconductor memory and outputs the information to the RAM 130. The drive 170 can also write a record into the removable storage medium 300 such as an inserted magnetic disk, optical disk, magneto-optical disk, and semiconductor memory. The removable storage medium 300 is, for example, a DVD medium, HD-DVD medium, or Blu-ray medium. The removable storage medium 300 may also be a semiconductor memory such as an SD memory card (Secure Digital memory card).

The storage device 180 is a device for data storage configured as an example of a storage unit of the information processing apparatus 100. The storage device 180 is configured by, for example, a magnetic storage unit device such as an HDD (Hard Disk Drive), semiconductor storage device, optical storage device, or magneto-optical storage device. The storage device 180 stores programs executed by the CPU 110, various kinds of data, and also various kinds of data acquired from outside.

The communication interface 190 includes a communication device to connect to the network 400. The communication interface 190 is, for example, a wire or wireless LAN (Local Area Network) or Bluetooth (registered trademark). The communication interface 190 may also be a router for optical communication, router for ADSL (Asymmetric Digital Subscriber Line), or modem for various kinds of communication. The network 400 is a network constructed by, for example, the Internet, home LAN, infrared-ray communication, radio wave communication, or satellite communication.

Each element of the information processing apparatus 100 described above is not limited to elements provided by being contained in the same cabinet and may be, for example, elements provided by being distributed in a network. For example, a storage device in a network may be used together with, or instead of, the storage device 180. Moreover, a portion or all of arithmetic processing described as being realized by the CPU 110 below may be realized by a server apparatus in the network 400.

Figure 2:
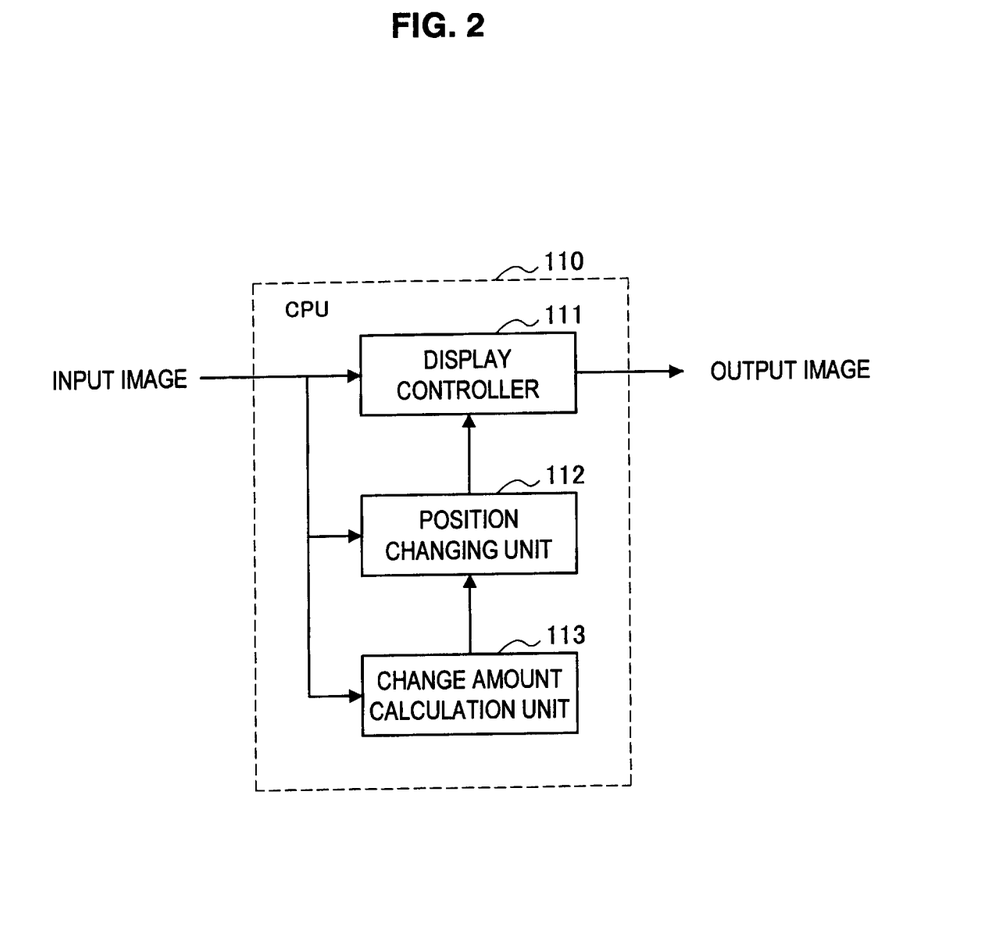
FIG. 2 is a block diagram illustrating a function of a CPU according to the first exemplary embodiment.

Subsequently, the function realized by the CPU 110 of the information processing apparatus 100 according to the first exemplary embodiment will be described with reference to FIG. 2. A reference to FIG. 2 shows that functions of a display controller 111, a position changing unit 112, and a change amount calculation unit 113 are realized by the CPU 110.

The CPU 110 generates an output image from an input image by using functions including each of the above functions. The input image contains, for example, a stereoscopic content image, which is a first image containing an object displayed with depth, and an operation panel image, which is a second image. The stereoscopic content image may be, for example, an image reproduced by, as descried above, the decoder 140. The operation panel image may be, for example, an image generated by the CPU 110 based on image data stored in the ROM 130. The output image is an image obtained by superimposing the operation panel image on the stereoscopic content image so that the display apparatus 200 is caused to display the image. Incidentally, the first image and the second image are not limited to the examples in the present disclosure and may be other images.

The display controller 111 superimposes the operation panel image, which is the second image, on the stereoscopic content image, which is the first image containing an object displayed with depth, to cause the display apparatus 200 to display the superimposed image stereoscopically (that being, a first stereoscopic image) on the display screen thereof. The display controller 111 may use an input image unchanged, or an image obtained after an input image is processed by the position changing unit 112 or the change amount calculation unit 113 may be used together with, or instead of, the input image. An image output by the display controller 111 may be an image to which a parallax for stereoscopic display is set.

The position changing unit 112 changes the position of the stereoscopic content image, object, or operation panel image in the depth direction so that overlapping of the object contained in the stereoscopic content image with the operation panel image in the depth direction is reduced. The position changing unit 112 processes one or both of the stereoscopic content image and operation panel image contained in an input image to provide a processed image to the display controller 111. The position changing unit 112 may change the position of the object or operation panel image in the depth direction by using a change amount calculated by the change amount calculation unit 113. The position changing unit 112 may also change the position of the object or operation panel image in the depth direction by using the change amount associated with the stereoscopic content image or object image using, for example, metadata. How to change the position of the object or operation panel image by the position changing unit 112 will be described later.

The change amount calculation unit 113 calculates the change amount by which the position of the object contained in the stereoscopic content image or the operation panel image in the depth direction is changed. If, for example, the stereoscopic content image is an image generated by computer graphics and position information of an object contained in the stereoscopic content image in the depth direction is given, the change amount calculation unit 113 may calculate the change amount by which the position of the object in the depth direction is changed based on the position information in the depth direction.

1-2. Position Change in Depth Direction

Figure 3:
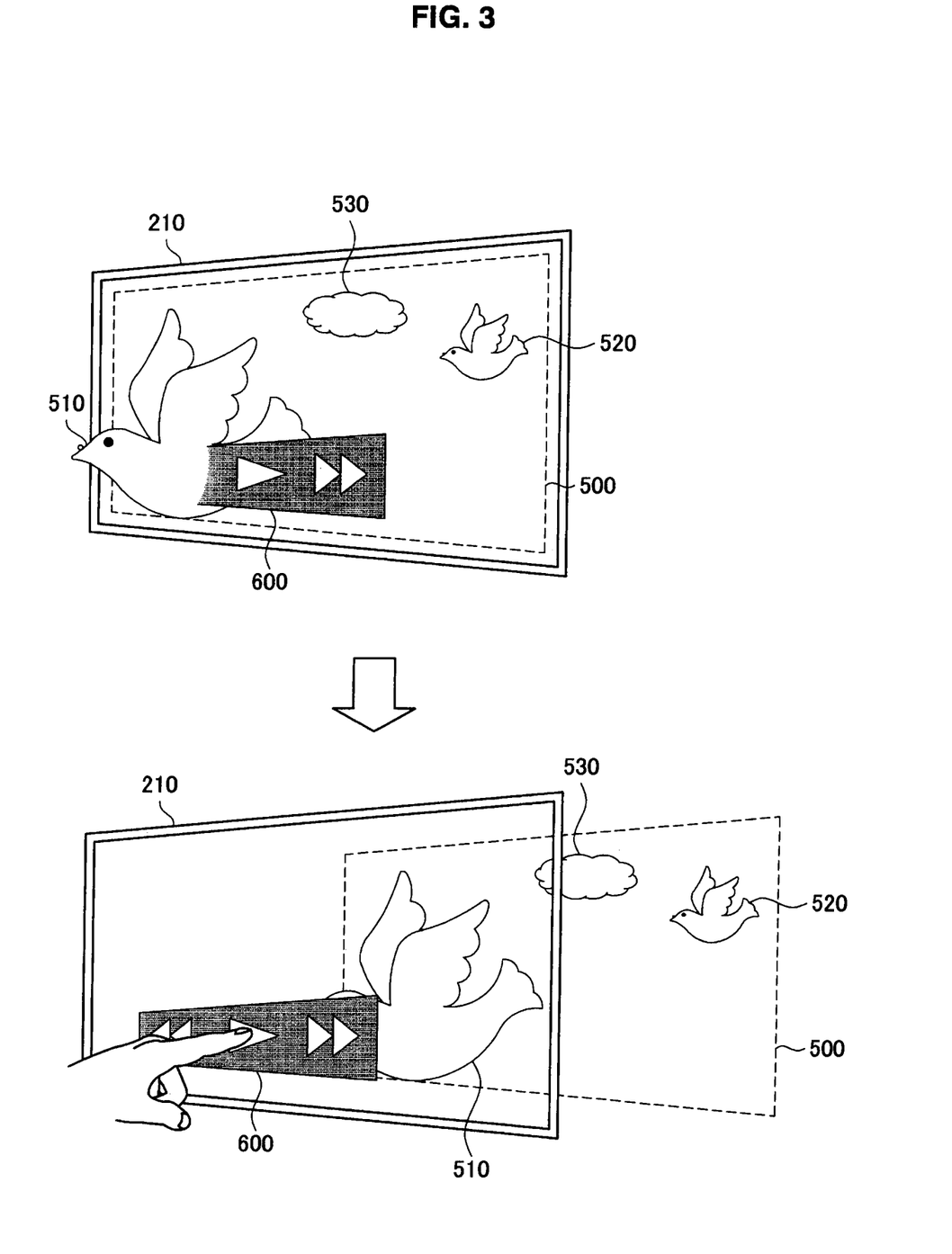
FIG. 3 is a diagram illustrating a position change of an image in a depth direction according to the first exemplary embodiment.

Subsequently, how to change the position of an image in the depth direction according to the first exemplary embodiment will be described with reference to FIG. 3. A reference to FIG. 3 shows that the position in the depth direction of a stereoscopic content image 500, which is the first image containing an object 510, an object 520, and an object 530, is changed so that overlapping of the object 510 and an operation panel image 600, which is the second image, is eliminated.

Before the position is changed, both of the reference plane on which the stereoscopic content image 500 is displayed and the reference plane on which the operation panel image 600 is displayed match a display screen 210 of the display apparatus 200. While both of the stereoscopic content image 500 and the operation panel image 600 are displayed stereoscopically, the operation panel image 600 is displayed on the reference plane matching the display screen 210 and thus, no parallax may actually be set.

Before the position is changed, the object 510 contained in the stereoscopic content image 500 is stereoscopically displayed as if a portion thereof is popping up from the reference plane. That is, the object 510 is displayed as if straddling the reference plane regarding the position in the depth direction. Here, the reference plane of the stereoscopic content image 500 matches the display screen 210. Thus, the object 510 overlaps with the operation panel image 600 displayed on the reference plane matching the display screen 210 in the depth direction. Therefore, it becomes difficult for the user to visually recognize a portion of the operation panel image 600 where the object 510 overlaps so that, for example, the operation of the information processing apparatus 100 using the operation panel image 600 is hindered. Accordingly, in the disclosed exemplary embodiments, the position changing unit 112 of the information processing apparatus 100 changes the position of the stereoscopic content image 500 containing the object 510 in the depth direction by the predetermined change amount toward a backward side.

The change amount by which the position of the stereoscopic content image 500 in the depth direction is changed may be an amount associated with the stereoscopic content image 500 in advance by using, for example, metadata. In this case, the change amount may be the maximum value of the popup amount when an object contained in the stereoscopic content image 500 is displayed by popping up from the reference plane. If the change amount is set in this manner, the object 510 and the operation panel image 600 no longer overlap in, for example, an illustrated state after the position change.

The change amount by which the position of the stereoscopic content image 500 in the depth direction is changed may also be, for example, an amount preset for the information processing apparatus 100. In this case, the change amount may be stored in, for example, the ROM 130 or the storage device 180. In an average stereoscopic content image, for example, the change amount may be the average maximum value of the popup amount when an object contained in the stereoscopic content image is displayed by being popped up from the reference plane. If the change amount is set in this manner, overlapping of the object 510 and the operation panel image 600 is eliminated or reduced in, for example, the illustrated state after the position change.

Further, the change amount by which the position of the stereoscopic content image 500 in the depth direction is changed may be an amount calculated by the change amount calculation unit 113. In this case, the change amount may be calculated by the change amount calculation unit 113 based on, for example, the position of each object in the depth direction associated with the stereoscopic content image 500. If the change amount is set in this manner, the object 510 and the operation panel image 600 no longer overlap in, for example, an illustrated state after the position change. If the change amount is set as described above, the change amount by which the position of the stereoscopic content image 500 in the depth direction is changed may be as small a value as possible necessary to realize the spatial relationship as described above between the object 510 and the operation panel image 600. In this case, an uncomfortable feeling that may be perceived by the user can be reduced by the position of the stereoscopic content image 500 in the depth direction being changed.

In such a state after the change, the user can visually recognize the operation panel image 600 easily. Thus, for example, if the operation unit 160 of the information processing apparatus 100 is a touch panel provided on the display screen 210 as illustrated, the user can easily operate the information processing apparatus 100 by using the operation panel image 600. By displaying the operation panel image 600 that may contain an image of fine characters on the reference plane matching the display screen 210 to which no parallax is actually set, a burden on user's vision can be relieved. If the operation unit 160 of the information processing apparatus 100 includes a touch panel, the user can operate the operation panel image 600 more intuitively. In this case, the position changing unit 112 changes the position of the stereoscopic content image 500 in the depth direction by the predetermined change amount toward the backward side determined so that the object 510 is displayed behind the reference plane.

Figure 4:
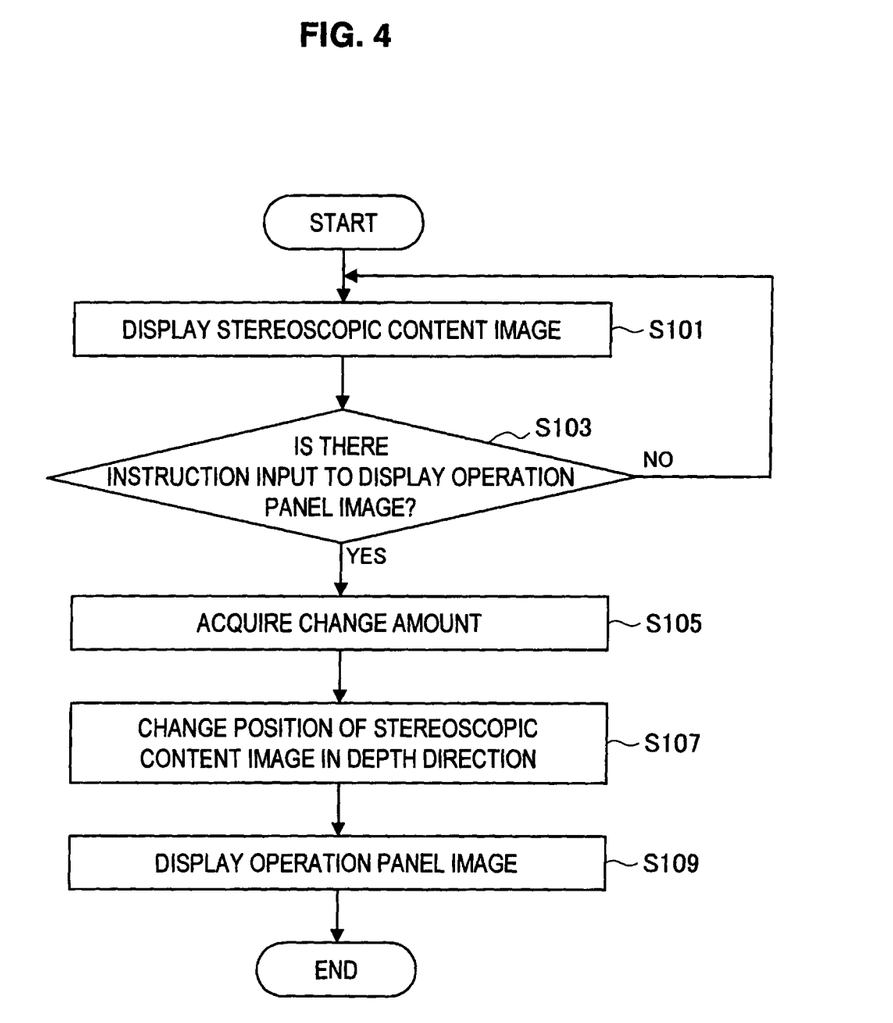
FIG. 4 is a flowchart illustrating processing of the information processing apparatus to change the position of the image in the depth direction according to the first exemplary embodiment.

Subsequently, processing by the information processing apparatus 100 to change the position of an image in the depth direction according to the first exemplary embodiment will be described with reference to FIG. 4.

First, the information processing apparatus 100 displays the stereoscopic content image 500 by the display apparatus 200 being controlled by the display controller 111 (step S101). If there is user's instruction input to have the operation panel image 600 displayed through the operation unit 160 (step S103), the information processing apparatus 100 proceeds to processing to change the position of the stereoscopic content image 500 in the depth direction. The user's instruction input to have the operation panel image 600 displayed may be touching somewhere on the display screen 210 when, for example, the operation unit 160 of the information processing apparatus 100 includes a touch panel. The user's instruction input may also be pressing a button provided near the display screen 210 of the display apparatus 200 or pressing a button of a remote controller. Each of these buttons functions as the operation unit 160 of the information processing apparatus 100.

If, on the other hand, there is no user's instruction input to have the operation panel image 600 displayed in step S103, the information processing apparatus 100 continues to display the stereoscopic content image 500 (step S101). In step S101, the display controller 111 may cause the display apparatus 200 to display a stereoscopic content image contained in an input image and reproduced by the decoder 140 unchanged as an output image.

If there is user's instruction input to have the operation panel image 600 displayed in step S103, the position changing unit 112 of the information processing apparatus 100 acquires a change amount by which the position of the stereoscopic content image 500 in the depth direction is changed (step S105). The change amount acquired here may be an amount associated with the stereoscopic content image 500 in advance by using, for example, metadata, an amount preset to the information processing apparatus 100, or an amount calculated by the change amount calculation unit 113.

Subsequently, the position changing unit 112 of the information processing apparatus 100 changes the position of the stereoscopic content image 500 in the depth direction based on the change amount acquired in step S105 (step S107). Further, the display controller 111 of the information processing apparatus 100 has the operation panel image 600 displayed by being superimposed on the stereoscopic content image 500 in which the position in the depth direction is changed in step S107 (step S109). With each of the above steps, the information processing apparatus 100 causes the display apparatus 200 to display an image in which the operation panel image 600 is superimposed on the stereoscopic content image 500 whose position in the depth direction has changed (that being, to display a second stereoscopic image).

In addition to changing the position of the stereoscopic content image 500 in the depth direction when the display of the operation panel image 600 is started by each of the above steps, the change of the position of the stereoscopic content image 500 in the depth direction may be undone when the display of the operation panel image 600 is completed. In this case, the position changing unit 112 changes the position of the stereoscopic content image 500 containing the object 510 in the depth direction while the display controller 111 has the operation panel image 600 displayed. Thus, when the operation panel image 600 is displayed, the user operates the information processing apparatus 100 by visually recognizing the operation panel image 600 easily. When the operation panel image 600 is not displayed, the user can view the stereoscopic content image 500 in the position in the original depth direction.

Figure 5:
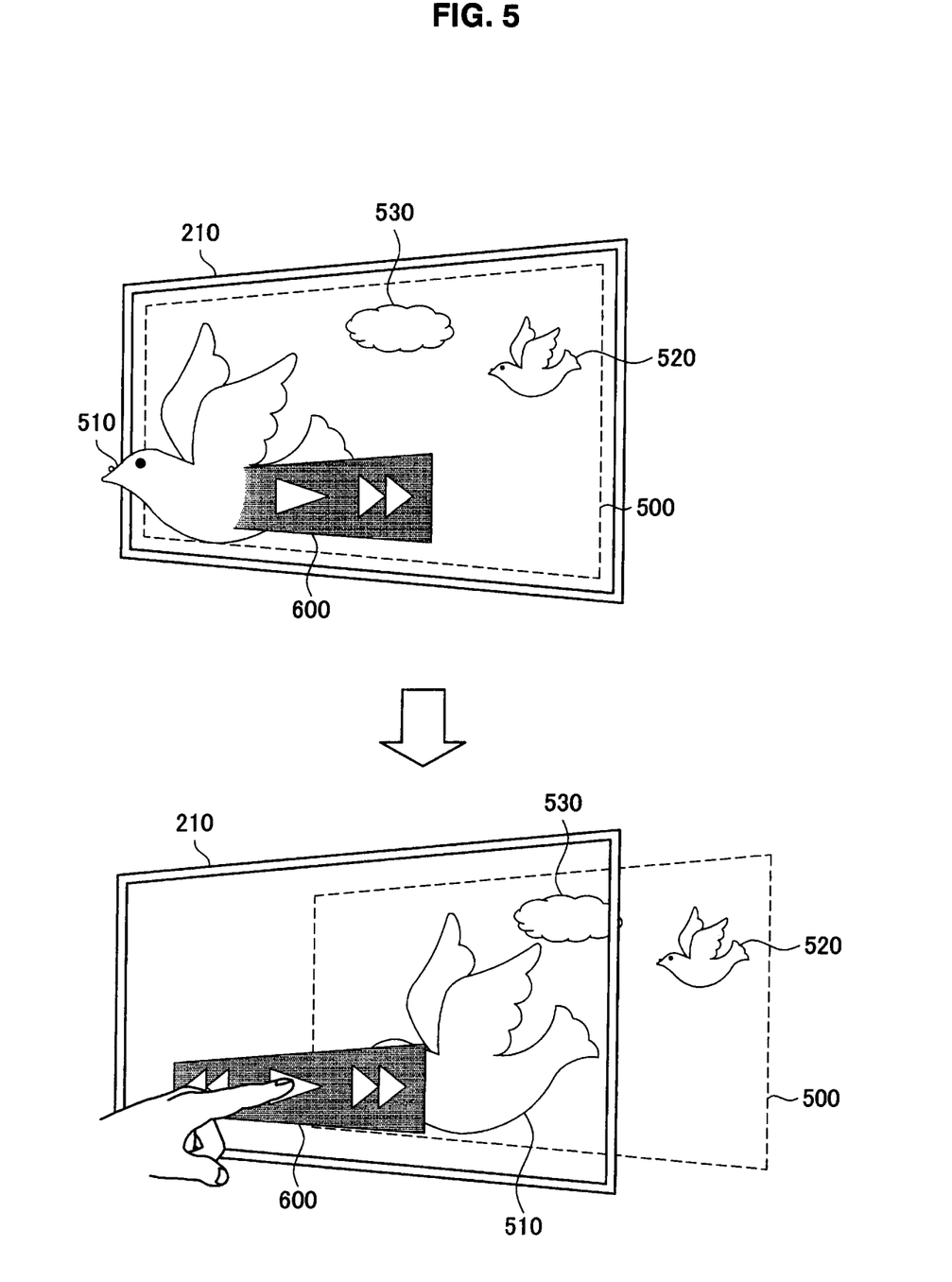
FIG. 5 is a diagram illustrating the position change of the image in the depth direction according to a second exemplary embodiment.
Figure 7:
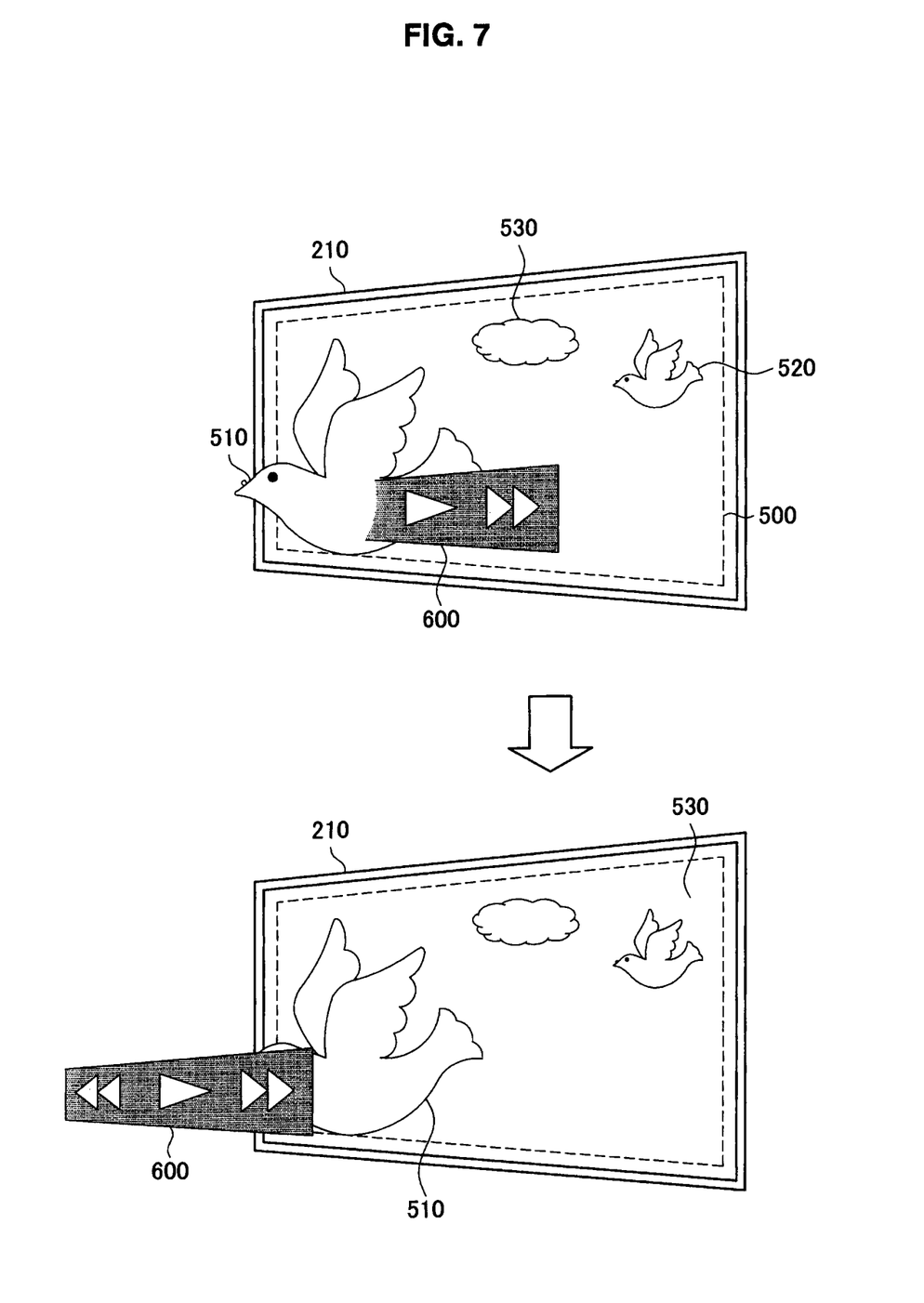
FIG. 7 is a diagram illustrating the position change of the image in the depth direction according to a third exemplary embodiment.

In FIG. 3, and FIGS. 5 and 7 described later, a state in which the display screen 210 is displayed together with the operation panel image 600 is displayed as a state before the position of the stereoscopic content image 500 in the depth direction is changed. However, these figures are intended to illustrate an occurrence of overlapping between the object 510 and the operation panel image 600. Thus, as described with reference to FIG. 4, the operation panel image 600 may be displayed after the position of the stereoscopic content image 500 in the depth direction is changed in actual processing.

2. Second Exemplary Embodiment

Subsequently, the second exemplary embodiment will be described. The second exemplary embodiment is different from the first exemplary embodiment in that the position of the stereoscopic content image 500 in the depth direction changes individually for each object instead of an image as a whole, but otherwise, the second exemplary embodiment is substantially the same as the first exemplary embodiment and thus, a detailed description thereof is omitted.

First, how to change the position of an image in the depth direction according to the second exemplary embodiment will be described with reference to FIG. 5. A reference to FIG. 5 shows that the respective positions in the depth direction of the object 510, the object 520, and the object 530 contained in the stereoscopic content image 500 that is the first image, are changed so that overlapping of the object 510 and the operation panel image 600 that is the second image, is eliminated.

In the illustrated example, the state before the change is the same as the state before the change in the first exemplary embodiment and the object 510 overlaps, in the depth direction, with the operation panel image 600 displayed on the reference plane matching the display screen 210. Thus, in the present exemplary embodiment, the position changing unit 112 of the information processing apparatus 100 changes the respective positions in the depth direction of the object 510, the object 520, and the object 530. More specifically, the position changing unit 112 can move the object 510 toward the backward side from the display screen 210 and move the object 520 and the object 530 toward the backward side in agreement with the movement of the object 510. That is, the display controller 111 has the stereoscopic content image 500 that is the first image, containing the object 510 and the other objects 520, 530 displayed stereoscopically and the position changing unit 112 changes the position of the object 510 in the depth direction by a change amount that is different from a change amount by which the positions of the objects 520, 530 in the depth direction are changed.

For example, the position changing unit 112 changes the position of the object 510 in the depth direction by a change amount acquired in the same manner as in the first exemplary embodiment. The change amount may be an amount associated with the stereoscopic content image 500 in advance by using, for example, metadata, an amount preset to the information processing apparatus 100, or an amount calculated by the change amount calculation unit 113.

Only the object 510 overlaps with the operation panel image 600 in the state before the change and thus, the position changing unit 112 may change only the position of the object 510 in the depth direction. In such a case, however, the user may have a sense of discomfort because only the position of the object 510 in the depth direction changes in the stereoscopic content image 500. Thus, the position changing unit 112 may change the positions of other objects such as the object 520 and the object 530 in the depth direction in such a way that the position change of the object 510 in the depth direction does not cause a sense of being unnatural.

Figure 6:
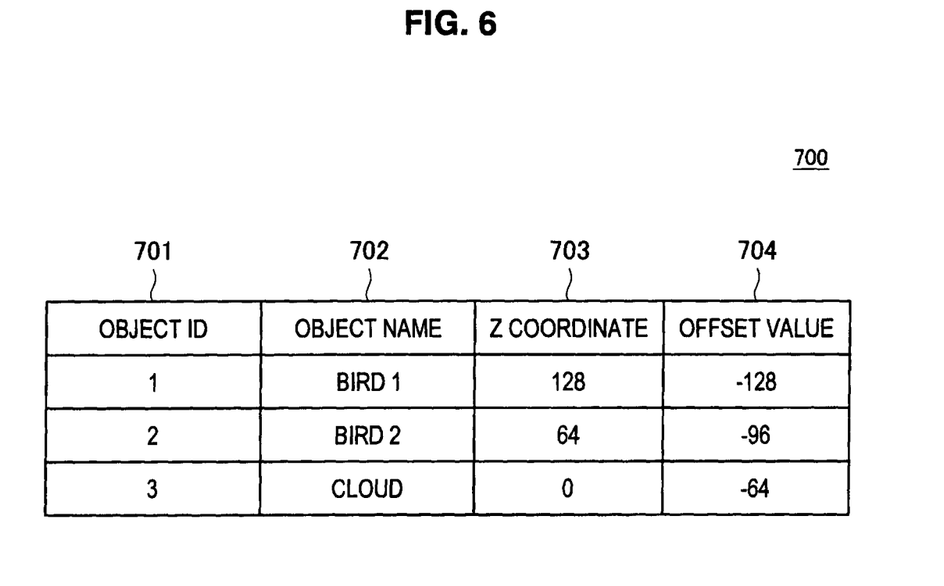
FIG. 6 is a diagram exemplifying depth data used in the second exemplary embodiment.

Subsequently, an example of depth data 700 that can be used in the second exemplary embodiment will be described with reference to FIG. 6. A reference to FIG. 6 shows that the depth data 700 contains object ID information 701, object name information 702, Z coordinate information 703, and offset value information 704 and may be data in the illustrated table form. The depth data 700 shown in FIG. 6 is schematic data corresponding to the example shown in FIG. 5. Actual depth data may contain information about still more objects and items contained in depth data may be different from items of the depth data 700 if, as described below, each object can be identified and a change amount of the position in the depth direction can be acquired.

The object ID information 701 is an ID to identify each object contained in the stereoscopic content image 500. In the illustrated example, the object ID of the object 510 is "1", the object ID of the object 520 is "2", and the object ID of the object 530 is "3".

The object name information 702 is a name given to each object contained in the stereoscopic content image 500. In the illustrated example, the object name of the object 510 is "Bird 1", the object name of the object 520 is "Bird 2", and the object name of the object 530 is "Cloud".

The Z coordinate information 703 is information about the position in the depth direction of each object contained in the stereoscopic content image 500. In the illustrated example, the Z coordinate of the object 510 is "128", the Z coordinate of the object 520 is "64", and the Z coordinate of the object 530 is "0". It is assumed here that the Z coordinate in the stereoscopic content image 500 is set in such a way that the forward side of the display screen 210 is positive in the depth direction and the Z coordinate is 0 on the reference plane of the stereoscopic content image 500. It is also assumed that the Z coordinate of each object indicates the Z coordinate of a portion closest to the forward side of each object. Therefore, in the stereoscopic content image 500 of the example shown in FIG. 5, the object 510 is displayed closest to the forward side, the object 520 is displayed behind the object 510, and the object 530 is displayed further behind.

The offset value information 704 is information about a change amount when the position in the depth direction of each object contained in the stereoscopic content image 500 is changed. In the illustrated example, the offset amount of the object 510 is "−128", the offset amount of the object 520 is "−96", and the offset amount of the object 530 is "−64". Therefore, in the example shown in FIG. 5, the position (Z coordinate) of each object in the depth direction before and after the position change changes from "128" to "0" for the object 510, from "64" to "−32" for the object 520, and from "0" to "−64" for the object 530.

If, for example, the position in the depth direction of each object contained in the stereoscopic content image 500 is changed based on the offset value information 704, the position in the depth direction of a portion closest to the forward side of the object 510 recedes to the position of the display screen 210 so that overlapping with the operation panel image 600 displayed on the reference plane matching the display screen 210 is eliminated. The object 520 and the object 530 are also moved in the same direction as the object 510 so that the object 520 is displayed behind the object 510 and the object 530 is displayed further behind. That is, the relationship of each object of the stereoscopic content image 500 in the depth direction is unchanged before and after the position change. Further, intervals between objects of the stereoscopic content image 500 in the depth direction are reduced after the position change when compared with before the position change. More specifically, the interval between the object 510 and the object 520 and the interval between the object 520 and the object 530 are both reduced from 64 before the position change to 32 after the position change.

By changing the position in the depth direction of each object contained in the stereoscopic content image 500 in this manner, discomfort caused by the change of display of the stereoscopic content image 500 and felt by the user can be alleviated while eliminating overlapping of the object 510 and the operation panel image 600. More specifically, a sense of discomfort caused by changes such as a reversal of spatial relationships of each object in the depth direction of the stereoscopic content image 500 or appearing that all objects in the stereoscopic content image recede significantly can be alleviated.

Depending on the type of the stereoscopic content image 500, there are some cases when discomfort felt by the user may seem to be small even if changes as described above occur. In such a case, for example, only the position in the depth direction of the object 510 overlapping with the operation panel image 600 may be changed or, like in the first exemplary embodiment, the position of the whole stereoscopic content image 500 in the depth direction may uniformly be changed. If the example of the Z coordinate information 703 shown in FIG. 6 is referred to, the Z coordinate of the object 520 is also "64" and so is displayed closer to the forward side than the display screen 210. However, as shown in FIG. 5, the position of the object 520 in the vertical and horizontal directions of the display screen 210 is different from the position of the operation panel image 600 and so does not overlap with the operation panel image 600 before the position change. Therefore, if, for example, only the position of the object 510 in the depth direction is changed, the object 520 may remain displayed closer to the forward side than the display screen 210 after the operation panel image 600 is displayed.

The second exemplary embodiment described above may be applied when, for example, the stereoscopic content image 500 is, like an image of a game, three-dimensional computer graphics rendered by using polygons having coordinate information. In this case, a change amount like the offset value information 704 may directly be defined in the depth data 700 or the change amount calculation unit 113 of the information processing apparatus 100 may calculate a change amount from the Z coordinate information 703.

3. Third Exemplary Embodiment

Subsequently, the third exemplary embodiment will be described. The third exemplary embodiment is different from the first exemplary embodiment in that the position in the depth direction of the operation panel image 600 is changed instead of the stereoscopic content image 500, but otherwise, the third exemplary embodiment is substantially the same as the first exemplary embodiment and thus, a detailed description thereof is omitted.

First, how to change the position of an image in the depth direction according to the third exemplary embodiment present disclosure will be described with reference to FIG. 7. A reference to FIG. 7 shows that the position in the depth direction of the operation panel image 600 that is the second image, is changed to eliminate overlapping of the object 510 contained in the stereoscopic content image 500 that is the first image, with the operation panel image 600.

In the illustrated example, the state before the change is the same as the state before the change in the first exemplary embodiment and the object 510 overlaps with the operation panel image 600 displayed on the reference plane matching the display screen 210 in the depth direction. Thus, in the present exemplary embodiment, the position changing unit 112 of the information processing apparatus 100 changes the position of the operation panel image 600 in the depth direction. More specifically, the position changing unit 112 can move the operation panel image 600 closer to the forward side than the object 510.

For example, the position changing unit 112 changes the position of the operation panel image 600 in the depth direction by the change amount acquired in the same manner as in the first exemplary embodiment. The change amount may be an amount associated with the stereoscopic content image 500 in advance by using, for example, metadata, an amount preset to the information processing apparatus 100, or an amount calculated by the change amount calculation unit 113.

In this case, the operation panel image 600 can be displayed so as to appear to be closer to the forward side than the display screen 210. Thus, if the operation unit 160 of the information processing apparatus 100 includes a touch panel, the user touches the backward side farther than the actually visible operation panel image 600, which may cause an uncomfortable feeling of the user. In such a case, the operation unit 160 may contain, for example, a proximity sensor capable of acquiring a proximity state by detecting a proximity of a portion of an operational tool to the modified display position of the operation panel image 600, and executing functionality of the display screen 210 in response to the detected proximity.

The present exemplary embodiment may be combined with the first exemplary embodiment or the second exemplary embodiment. If, for example, the position changing unit 112 changes the position of the operation panel image 600 in the depth direction and even thereafter, for example, the object 510 and the operation panel image 600 overlap, like the first exemplary embodiment or the second exemplary embodiment, the position of the object 510 in the depth direction may be changed. In this case, if, for example, the object 510 and the operation panel image 600 overlap even after an allowable range of a predetermined width is set to the position of the operation panel image 600 in the depth direction after the position change and the position of the operation panel image 600 in the depth direction is changed toward the forward side within the allowable range, the information processing apparatus 100 may be set so that the position of the object 510 in the depth direction is further changed.

It should be understood by those skilled in the art that various modifications, combinations, sub-combinations and alterations may occur depending on design requirements and other factors insofar as they are within the scope of the appended claims or the equivalents thereof.

In the above exemplary embodiments, for example, it is assumed that the reference plane on which a stereoscopic content image or an operation panel image is displayed matches the display screen, but the disclosed embodiments are not limited to such examples. For example, the reference plane may be adjustable by a user's operation. The adjustment may be made during initialization. The adjustment may also be made after the operation panel image is displayed.

The present disclosure contains subject matter related to that disclosed in Japanese Priority Patent Application JP 2010-209833 filed in the Japan Patent Office on Sep. 17, 2010, the entire content of which is hereby incorporated by reference.

What is claimed is:
1. An information processing apparatus, comprising:
a sensor configured to acquire a first operation; and
circuitry configured to
  control a display to display a stereoscopic image,
  control the display to display an operation panel displayed in response to the first operation,
  compute a displacement value based on a display position of the stereoscopic image in a depth direction and a display position of the operation panel in the depth direction,
  modify the display position of the operation panel within an allowable range of the display position of the operation panel in the depth direction based on the computed displacement value, and
  modify the display position of one or more objects within the stereoscopic image in the depth direction by a further modification based on a degree of modification of the modified display position of the operation panel within the allowable range of the display position of the operation panel subsequent to an initial modification of the display position of the stereoscopic image,
wherein the circuitry determines, based on a type of the stereoscopic image, whether the further modification modifies the display position of objects overlapping the modified display position of the operation panel or modifies the display position of each object within the stereoscopic image,
wherein the modified display position of each object is an offset value defined in depth data, the depth data further indicating object name, object ID information, and Z coordinate information, for the type of the stereoscopic image being a three-dimensional computer graphics rendered by using polygons having coordinate information, wherein the sensor is further configured to acquire a second operation to operate the operation panel, and wherein the sensor acquires the second operation based on detection of one or more proximity inputs according to a proximity of a portion of an operational tool to the modified display position of the operation panel.

2. The information processing apparatus of claim 1, wherein: the display positions of the stereoscopic image and the operation panel are associated with corresponding displacements relative to the display in the depth direction.

3. The information processing apparatus of claim 1, wherein the operation panel comprises a user interface associated with the display.

4. The information processing apparatus of claim 3, wherein the circuitry is further configured to initiate display of the user interface in response to the first operation.

5. The information processing apparatus of claim 3, wherein the user interface is further configured to be disposed between a user and the display in the depth direction, and the stereoscopic image is further configured to be disposed behind the display in the depth direction.

6. A method for processing information, the method being executed by a processor, and comprising:
 acquiring a first operation;
 displaying a stereoscopic image;
 displaying an operation panel displayed in response to the first operation;
 computing a displacement value based on a display position of the stereoscopic image in a depth direction and a display position of the operation panel in the depth direction;
 modifying the display position of the operation panel within an allowable range of the display position of the operation panel in the depth direction based on the computed displacement value;
 modifying the display position of one or more objects within the stereoscopic image in the depth direction by a further modification based on a degree of modification of the modified display position of the operation panel within the allowable range of the display position of the operation panel subsequent to an initial modification of the display position of the stereoscopic image; and
 acquiring a second operation to operate the operation panel,
 wherein a determination whether the further modification modifies the display position of objects overlapping the modified display position of the operation panel or modifies the display position of each object within the stereoscopic image is performed based on a type of the stereoscopic image,
 wherein the modified display position of each object is an offset value defined in depth data, the depth data further indicating object name, object ID information, and Z coordinate information, for the type of the stereoscopic image being a three-dimensional computer graphics rendered by using polygons having coordinate information, and
 wherein the second operation is acquired by a sensor based on detection of one or more proximity inputs according to a proximity of a portion of an operational tool to the modified display position of the operation panel.

7. A non-transitory, computer-readable storage medium storing a program that, when executed by a processor, causes the processor to execute a method for processing information, the method comprising:
 acquiring a first operation;
 displaying a stereoscopic image;
 displaying an operation panel displayed in response to the first operation;
 computing a displacement value based on a display position of the stereoscopic image in a depth direction and a display position of the operation panel in the depth direction;
 modifying the display position of the operation panel within an allowable range of the display position of the operation panel in the depth direction based on the computed displacement value;
 modifying the display position of one or more objects within the stereoscopic image in the depth direction by a further modification based on a degree of modification of the modified display position of the operation panel within the allowable range of the display position of the operation panel subsequent to an initial modification of the display position of the stereoscopic image; and
 acquiring a second operation to operate the operation panel,
 wherein a determination whether the further modification modifies the display position of objects overlapping the modified display position of the operation panel or modifies the display position of each object within the stereoscopic image is performed based on a type of the stereoscopic image,
 wherein the modified display position of each object is an offset value defined in depth data, the depth data further indicating object name, object ID information, and Z coordinate information, for the type of the stereoscopic image being a three-dimensional computer graphics rendered by using polygons having coordinate information, and
 wherein the second operation is acquired by a sensor based on detection of one or more proximity inputs according to a proximity of a portion of an operational tool to the modified display position of the operation panel.

8. The information processing apparatus of claim 1, wherein the sensor comprises a proximity sensor configured to acquire the proximity of the portion of the operational tool to the modified display position of the operation panel.

9. The information processing apparatus of claim 1, wherein the operation panel includes a plurality of operation buttons.

10. The information processing apparatus of claim 1, wherein modifying the display position of the operation panel comprises displaying the operation panel in front of a display screen that is configured to display the stereoscopic image and the operation panel.

11. The information processing apparatus of claim 1, after modifying the display position of the operation panel, the operation panel is displayed by being superimposed on the stereoscopic image.

12. The information processing apparatus of claim 1, wherein the information processing apparatus further comprises a communication interface.

13. The information processing apparatus of claim 1, wherein a function of the operation panel is executed based on the detection of the one or more proximity inputs when the portion of the operational tool is determined to be in proximity to the modified display position of the operation panel.

14. The information processing apparatus of claim 1, wherein the circuitry modifies the display position of the operation panel in the depth direction to a maximum value of the allowable range of the display position of the operation panel.

15. The information processing apparatus of claim 1, wherein the circuitry modifies the display position of the operation panel forward in the depth direction and modifies the display position of the stereoscopic image backward in the depth direction.

* * * * *